US009893925B1

(12) United States Patent
Patel

(10) Patent No.: US 9,893,925 B1
(45) Date of Patent: Feb. 13, 2018

(54) METHOD AND APPARATUS FOR JOINT TIME AND FREQUENCY SYNCHRONIZATION IN WIRELESS COMMUNICATION SYSTEMS

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 132 days.

(21) Appl. No.: 15/088,407

(22) Filed: Apr. 1, 2016

(51) Int. Cl.
- *H04J 11/00* (2006.01)
- *H04L 27/00* (2006.01)
- *H04L 27/26* (2006.01)
- *H04W 56/00* (2009.01)

(Continued)

(52) U.S. Cl.
CPC ........... *H04L 27/2675* (2013.01); *H04L 7/04* (2013.01); *H04W 56/0035* (2013.01); *H04L 5/143* (2013.01)

(58) Field of Classification Search
CPC .......... H04L 7/042; H04L 2027/0034; H04L 2027/0067; H04L 27/2663; H04L 7/08; H04L 25/03331; H04L 27/2614; H04L 27/2659; H04L 27/2665; H04L 27/2678; H04L 27/2679; H04L 27/2607; H04L 27/266; H04J 11/0089; H04J 11/0073; H04J 11/0076; H04J 11/0086; H04J 27/2607; H04J 13/0062; H04W 56/003; H04W 56/0035

See application file for complete search history.

(56) References Cited

U.S. PATENT DOCUMENTS

| 6,658,063 | B1 * | 12/2003 | Mizoguchi | .......... | H04L 27/2657 375/260 |
| 8,111,770 | B1 * | 2/2012 | Moon | ............... | H04L 25/03203 375/267 |

(Continued)

OTHER PUBLICATIONS

Lte Advanced "3rd Generation Partnership Project; Technical Specification Group Radio Access Network; Evolved Universal Terrestrial Radio Access (E-UTRA) Physical channels and modulation (Release 12)" 3GPP TS 36.211 v12.8.0 (Dec. 2015).

*Primary Examiner* — Ahmed Elallam
(74) *Attorney, Agent, or Firm* — Lerner, David, Littenberg, Krumholz & Mentlik, LLP

(57) ABSTRACT

In a wireless communication system, a client terminal may first establish time and frequency synchronization with the network. While establishing the time and frequency synchronization, a client terminal may need to detect additional parameters about the network, such as physical cell identity, before it can initiate communication with the wireless communication system. Detecting the network parameters in presence of time and frequency offsets increases the complexity of the initial cell search procedure that includes time and frequency synchronization as well as detection of network parameters. A method and apparatus are disclosed that achieve joint time and frequency synchronization by utilizing the relationship between frequency offset and the apparent timing shift. The joint time and frequency synchronization enables faster and more reliable synchronization with the wireless communication system.

20 Claims, 15 Drawing Sheets

(51) Int. Cl.
*H04L 7/04* (2006.01)
*H04L 5/14* (2006.01)

(56) References Cited

U.S. PATENT DOCUMENTS

| | | | | |
|---|---|---|---|---|
| 8,270,545 B2* | 9/2012 | Li | ............... | H04L 27/266 |
| | | | | 370/210 |
| 8,300,621 B2* | 10/2012 | Lim | ............... | H04L 27/0014 |
| | | | | 365/189.12 |
| 8,446,894 B2* | 5/2013 | Li | ............... | H04L 27/2656 |
| | | | | 370/350 |
| 8,447,005 B2* | 5/2013 | Axmon | ............... | H04J 11/0069 |
| | | | | 375/142 |
| 8,520,778 B2* | 8/2013 | Sameer | ............... | H04L 27/2659 |
| | | | | 375/326 |
| 8,594,135 B2* | 11/2013 | Porat | ............... | H04L 27/2647 |
| | | | | 370/504 |
| 8,767,848 B2* | 7/2014 | Kim | ............... | H04J 11/0079 |
| | | | | 375/260 |
| 9,065,630 B1* | 6/2015 | Xiao | ............... | H04L 7/042 |
| 9,203,675 B2* | 12/2015 | Yang | ............... | H04L 27/2659 |
| 9,337,994 B2* | 5/2016 | Zhang | ............... | H04L 7/0016 |
| 9,474,016 B2* | 10/2016 | Mindru | ............... | H04J 11/0079 |
| 9,553,752 B1* | 1/2017 | Patel | ............... | H04L 27/266 |
| 9,621,340 B1* | 4/2017 | Gowda | ............... | H04L 7/08 |
| 9,674,808 B1* | 6/2017 | Patel | ............... | H04W 56/0015 |
| 2008/0043858 A1* | 2/2008 | Lim | ............... | H04J 11/00 |
| | | | | 375/260 |
| 2015/0208369 A1* | 7/2015 | Chiueh | ............... | H04W 56/001 |
| | | | | 370/350 |
| 2015/0280849 A1* | 10/2015 | Tsai | ............... | H04J 11/0076 |
| | | | | 370/328 |
| 2016/0337105 A1* | 11/2016 | Lawton | ............... | H04L 5/0057 |
| 2017/0093540 A1* | 3/2017 | Lei | ............... | H04L 5/0044 |
| 2017/0223648 A1* | 8/2017 | Shin | ............... | G06F 13/4273 |

* cited by examiner

FIG. 11

| PSS Root Index | # of Frequency Offsets | Frequency Offsets (Hz) | Timing shift (in terms of samples at 1.92 Msps) |
|---|---|---|---|
| 25 | 5 | 0, 10000, 15000, -10000, -15000 | 0, -52, -52, 52, -76 |
| 29 | 5 | 0, 10000, 15000, -10000, -15000 | 0, -59, -59, -69, 59 |
| 34 | 3 | 0, 10000, -10000 | 0, 59, -59 |

METHOD AND APPARATUS FOR JOINT TIME AND FREQUENCY SYNCHRONIZATION IN WIRELESS COMMUNICATION SYSTEMS

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on a periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be on the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use a Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred to herein as an OFDM signal.

In addition to the purposes mentioned above, the CP often may be used for frequency offset estimation at the receiver. Any frequency offset at the receiver relative to the center frequency of the transmitted signal may cause the phase of the received signal to change linearly as a function of time. The two parts of an OFDM signal that are identical at the transmitter, i.e., the CP and the tail portion of the OFDM symbol, may undergo different phase change at the receiver due to the frequency offset. Therefore, the frequency offset can be estimated by performing correlation between the CP and the tail portion of an OFDM symbol. The angle of the CP correlation indicates the amount of phase rotation that is accumulated over the duration of an OFDM symbol. This accumulated phase rotation may then used for frequency offset estimation. Let the incoming OFDM signal at a receiver be denoted by z(n) where n is the sample index. As illustrated in FIG. 4, let the length of an OFDM symbol, in terms of samples, excluding the CP portion, be denoted by N. Let the length of the CP portion, in terms of samples, be denoted by L. The CP correlation $R_{cp}(n)$ at any sample index n may be computed as follows:

$$R_{cp}(n) = \left| \frac{1}{L} \sum_{l=0}^{L-1} z(n-l) \cdot z^*(n-l-N) \right| \tag{1}$$

where z* denotes complex conjugate of z and |•| denotes absolute value of its argument. Although the CP correlation may be computed for many different sample indices, it is expected to have a large value only for sample indices that correspond to the CP portion of the OFDM symbol. The largest CP correlation value in the duration over which CP correlation is performed may be considered for frequency offset estimation. The average power of the samples used for CP correlation may be computed as follows:

$$P_{cp}(n) = \frac{1}{2}\sum_{l=0}^{L-1} z(n-l)z^*(n-l) + z(n-l-N)z^*(n-l-N) \quad (2)$$

The CP correlation values are normalized using the estimated power of the OFDM symbol samples used in CP correlation. Specifically, the normalized CP correlation is given as follows:

$$r_{cp}(n) = \frac{R_{cp}(n)}{P_{cp}(n)} \quad (3)$$

Most wireless communication systems may employ some form of framing in the air interface. For example, 10 ms radio frames are used in the $3^{rd}$ Generation Partnership Project (3GPP) Long Term Evolution (LTE) wireless communication systems and each radio frame comprises 10 subframes as shown in FIG. 5. Each subframe in turn consists of two slots and each slot consists of 6 or 7 OFDM symbols depending on the type of CP used as shown in FIG. 6. In the 3GPP LTE wireless communication system, two different CP lengths are used and they are referred to as Normal CP and Extended CP. In wireless communication systems, normally the specific air interface frame structure repeats itself over certain periodicity.

The 3GPP LTE wireless communication system uses the following synchronization signals to assist the client terminal in achieving time and frequency synchronization as well as the detection of physical layer cell identity:

Primary Synchronization Signal (PSS)
Secondary Synchronization Signal (SSS)

The positions of the PSS and SSS are illustrated in FIG. 6 for the FDD air-interface of a 3GPP LTE wireless communication system. Note that the FIG. 6 shows the position of the PSS and SSS for both the Normal CP and Extended CP. FIG. 7 illustrates the PSS and SSS positions for TDD air-interface of 3GPP LTE wireless communication system. The PSS and SSS signals for different cells may be different as described below.

The different PSS and SSS are identified by different signal sequences used for transmission. Specifically, 504 physical cell identities are defined in 3GPP LTE wireless communication system specifications and they are organized into 168 groups with three identities in each group. The SSS sequence identifies the physical cell identity group and PSS sequence identifies the physical cell identity within a group. Detecting a physical cell identity requires the detection of both the PSS and the SSS.

The PSS sequence in frequency domain is a length 63 Zadoff-Chu sequence extended with five zeros on each side and mapped to central 72 sub-carriers as shown in FIG. 8. The Direct Current (DC) subcarrier is not used. In 3GPP LTE wireless communication system three different PSS sequences are used with Zadoff-Chu root indices 24, 29 and 34 corresponding to cell identity 0, 1 and 2 respectively within the physical cell identity group. The exact PSS sequences are defined in "3rd Generation Partnership Project; Technical Specification Group Radio Access Network; Evolved Universal Terrestrial Radio Access (E-UTRA); Physical channels and modulation (Release 12)," 3GPP TS 36.211 V12.8.0, December 2015, at Section 6.11, incorporated by reference herein. At the base station transmitter, the time domain PSS signal may be obtained by performing Inverse Discrete Fourier Transform (IDFT) of the frequency domain PSS. The two time domain PSS instances present within a 10 ms radio frame as shown in FIG. 7 and FIG. 8 are identical. The two SSS sequences present in a 10 ms radio frame are different, namely $SSS_1$ and $SSS_2$ as shown in FIG. 7 and FIG. 8, which allows the client terminal to detect 10 ms radio frame timing from the reception of a single SSS.

After PSS detection by a client terminal, frequency domain processing may be employed for further analysis, such as SSS search. The SSS search may have to handle timing and frequency offset ambiguities in addition to other system unknowns such as CP type and duplexing type. The relative timing (in terms of number of samples) between SSS and PSS varies depending upon CP and duplexing type. Multiple SSS search attempts may be required to resolve unknown system parameters such as CP type and duplexing type. If CP type is known prior to SSS detection, for example using a CP correlator, corresponding SSS detection attempts may be skipped. The PSS detection may result in multiple possible PSS positions being detected due to the presence of multiple cells surrounding the client terminal.

Frequency offset in OFDM systems generally manifests itself in two components commonly referred as integer frequency offset and fractional frequency offset. Integer frequency offset refers to the frequency offset in terms of an integral number of the subcarriers and the fractional frequency offset refers to the frequency offset remaining after excluding the integer frequency offset. In a 3GPP LTE wireless communication system the frequency spacing between subcarriers is 15 kHz. Therefore, for example, a frequency offset of 35 kHz at the client terminal manifests itself as two subcarrier offsets (30 kHz) plus a fractional frequency offset of 5 kHz. Since the subcarrier spacing is 15 kHz, the maximum fractional frequency offset may be half of the subcarrier spacing of 15 kHz. Therefore, the range of possible fractional frequency offset values may be in the range±7500 Hz.

Fractional frequency offset may be compensated by estimating it using conventional methods such as CP correlation. In conventional systems, the integer frequency offset may be detected in the frequency domain by attempting to decode SSS with different hypotheses about different SSS frequency bin positions.

One of the commonly used methods for PSS detection is the cross correlation of the received signal with the local replica for the three possible candidates. However, the structure of the 3GPP LTE wireless communication system air interface synchronization signal PSS is such that the presence of frequency offset causes a shift in the apparent detected timing position of the PSS.

In PSS detection, the incoming signal may be cross correlated with the local replica of the PSS sequence for all three root sequence indices. Let the local replica of the PSS signal for the $m^{th}$ PSS root sequence index be denoted by $p_m(n)$ with m=0, 1, or 2. Let the incoming signal be denoted by z(n). The cross correlation between these two signals is computed as follows:

$$R_{PSS\_m}(n) = \left| \frac{1}{K} \sum_{k=0}^{K-1} z(n-k) \cdot p_m^*(K-k) \right| \quad (4)$$

where K is the length of the PSS local replica signal at the sampling rate of the incoming signal z(n).

The cross correlation peaks at a time instant when the incoming signal aligns and matches with one of the three replicas as illustrated in FIG. 9. The location of this cross correlation peak is used as an indicator of the PSS position and that position is used as a reference for subsequent SSS detection. The X-axis in FIG. 9 indicates the location of the detected peak relative to the true PSS time position.

When the cross correlation is performed with the received signal that has a frequency offset relative to the receiver's frequency, the cross correlation peak shifts as a function of the frequency offset as illustrated in FIG. 10. As illustrated in FIG. 10, the magnitude of the cross correlation peak reduces if a frequency offset is present. Furthermore, the location of the peak may be shifted relative to the true position as illustrated in FIG. 10. There may be multiple peaks of comparable magnitude at respective different time positions relative to the true position for a single received signal with a single frequency offset as illustrated in FIG. 10.

SUMMARY

A method and apparatus are disclosed that achieve joint time and frequency synchronization by utilizing the relationship between frequency offset and the apparent timing shift of PSS cross correlation peak. The joint time and frequency synchronization reduces the number of hypotheses to be considered for SSS detection which in turn enables faster and more reliable synchronization with the wireless communication system.

In accordance with an aspect of the disclosure, a method may determine time and frequency offset at a client device in a wireless communication system. The method may include controlling, by a processing device, determining a cyclic prefix (CP) correlation, $R_{cp}(n)$, for an incoming Orthogonal Frequency Division Multiplexing (OFDM) signal $z(n)$, wherein n is a sample index of the OFDM signal $z(n)$, $$R_{cp}(n) = \left| \frac{1}{L} \sum_{l=0}^{L-1} z(n-l) \cdot z^*(n-l-N) \right|,$$

$z^*$ is a complex conjugate of z, N is a length in samples of an OFDM symbol of the OFDM signal $z(n)$ which excludes a CP portion of the OFDM symbol, and L is a length in samples of the CP portion; determining an average CP power, $P_{cp}(n)$, for the OFDM signal $z(n)$, wherein $$P_{cp}(n) = \frac{1}{2} \sum_{l=0}^{L-1} z(n-l)z^*(n-l) + z(n-l-N)z^*(n-l-N);$$

combining and normalizing the $R_{cp}(n)$ and the $P_{cp}(n)$ to obtain normalized combined CP correlation values; determining an estimated fractional frequency offset from a phase of a maximum value of the normalized combined CP correlation values; determining a composite frequency offset by summing the estimated fractional frequency offset and a predetermined integer frequency offset; determining a Primary Synchronization Signal (PSS) cross correlation, $R_{PSS\_m}(n)$, for the OFDM signal $z(n)$, for each of a plurality of replicas of a PSS signal respectively corresponding to an $m^{th}$ index of a PSS root sequence, wherein $$R_{PSS\_m}(n) = \left| \frac{1}{K} \sum_{k=0}^{K-1} z(n-k) \cdot p_m^*(K-k) \right|,$$

$p_m(n)$ is the replica of the PSS signal having the index m, and K is a length in samples of the replica of the PSS signal $p_m(n)$ at a sampling rate of the OFDM signal $z(n)$, and the plurality of replicas of the PSS signals are stored in a memory; determining an average power, $P_{avg\_m}(n)$, of the OFDM signal $z(n)$ and each $m^{th}$ replica of the PSS signal from the memory, wherein $$P_{avg_m}(n) = \sqrt{|P_z(n)| \times |P_{lr_m}|}, \; P_z(n) = \left| \frac{1}{K} \sum_{k=0}^{K-1} z(n-k) \cdot z^*(n-k) \right|,$$

and $$P_{lr\_m} = \left| \frac{1}{K} \sum_{k=0}^{K-1} p_m(k) \cdot p_m^*(k) \right|;$$

combining, for each respective $m^{th}$ index, the PSS cross correlation, $R_{PSS\_m}(n)$, and the average power, $P_{avg\_m}(n)$, to obtain combined PSS cross correlation values, and normalizing the PSS cross correlation values to obtain normalized combined PSS cross correlation values; determining a maximum value of the normalized combined PSS cross correlation values as an estimated PSS cross correlation peak; determining, from a table in the memory, based on the estimated composite frequency offset, an apparent timing shift in a PSS cross correlation peak of the OFDM signal $z(n)$, in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

In one alternative, the normalized combined PSS correlation values may be determined from $|R_{PSS\_m}(n)|/P_{avg\_m}(n)$.

In one alternative, the normalized combined CP correlation values may be determined from $R_{cp}(n)/P_{cp}(n)$.

In one alternative, the method may include controlling, by the processing device, determining a Secondary Synchronization Signal (SSS) based on the detected PSS cross correlation peak position.

In one alternative, the predetermined integer frequency offset may be selected from a plurality of different integer frequency offsets.

In one alternative, the plurality of replicas of a PSS signal may include three replicas of PSS signals.

In one alternative, the memory may include information indicating, for each of the $m^{th}$ indices of the PSS root sequence, a predetermined number of timing shifts in the PSS cross correlation peak for respective frequency offsets.

In one alternative, the determining of the PSS cross correlation and the CP correlation for the OFDM signal $z(n)$ may be performed with a periodicity that is a multiple of 5 ms.

In one alternative, the normalized combined PSS cross correlation values may be stored in the memory for each sample n of a predetermined period of the OFDM signal z(n) during which the PSS cross correlation is determined.

In accordance with an aspect of the disclosure, an apparatus may determine time and frequency offset at a client device in a wireless communication system. The apparatus may include circuitry configured to control: determining a cyclic prefix (CP) correlation, $R_{cp}(n)$, for an incoming Orthogonal Frequency Division Multiplexing (OFDM) signal z(n), wherein n is a sample index of the OFDM signal z(n), $$R_{cp}(n) = \left| \frac{1}{L} \sum_{l=0}^{L-1} z(n-l) \cdot z^*(n-l-N) \right|,$$

$z^*$ is a complex conjugate of z, N is a length in samples of an OFDM symbol of the OFDM signal z(n) which excludes a CP portion of the OFDM symbol, and L is a length in samples of the CP portion; determining an average CP power, $P_{cp}(n)$, for the OFDM signal z(n), wherein $$P_{cp}(n) = \frac{1}{2} \sum_{l=0}^{L-1} z(n-l)z^*(n-l) + z(n-l-N)z^*(n-l-N);$$

combining and normalizing the $R_{cp}(n)$ and the $P_{cp}(n)$ to obtain normalized combined CP correlation values; determining an estimated fractional frequency offset from a phase of a maximum value of the normalized combined CP correlation values; determining a composite frequency offset by summing the estimated fractional frequency offset and a predetermined integer frequency offset; determining a Primary Synchronization Signal (PSS) cross correlation, $R_{PSS\_m}(n)$, for the OFDM signal z(n), for each of a plurality of replicas of a PSS signal respectively corresponding to an $m^{th}$ index of a PSS root sequence, wherein $$R_{PSS\_m}(n) = \left| \frac{1}{K} \sum_{k=0}^{K-1} z(n-k) \cdot p_m^*(K-k) \right|,$$

$p_m(n)$ is the replica of the PSS signal having the index m, and K is a length in samples of the replica of the PSS signal $p_m(n)$ at a sampling rate of the OFDM signal z(n), and the plurality of replicas of the PSS signals are stored in a memory; determining an average power, $P_{avg\_m}(n)$, of the OFDM signal z(n) and each $m^{th}$ replica of the PSS signal from the memory, wherein $$P_{avg_m}(n) = \sqrt{|P_z(n)| \times |P_{tr_m}|}, \; P_z(n) = \left| \frac{1}{K} \sum_{k=0}^{K-1} z(n-k) \cdot z^*(n-k) \right|,$$

and $$P_{tr\_m} = \left| \frac{1}{K} \sum_{k=0}^{K-1} p_m(k) \cdot p_m^*(k) \right|;$$

combining, for each respective $m^{th}$ index, the PSS cross correlation, $R_{PSS\_m}(n)$, and the average power, $P_{avg\_m}$, to obtain combined PSS cross correlation values, and normalizing the PSS cross correlation values to obtain normalized combined PSS cross correlation values; determining a maximum value of the normalized combined PSS cross correlation values as an estimated PSS cross correlation peak; determining, from a table in the memory, based on the estimated composite frequency offset, an apparent timing shift in a PSS cross correlation peak of the OFDM signal z(n), in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

In one alternative of the apparatus, the normalized combined PSS correlation values may be determined from $|R_{PSS\_m}(n)|/P_{avg\_m}(n)$.

In one alternative of the apparatus, the normalized combined CP correlation values may be determined from $R_{cp}(n)/P_{cp}(n)$.

In one alternative of the apparatus, the circuitry may be configured to control determining a Secondary Synchronization Signal (SSS) based on the detected PSS cross correlation peak position.

In one alternative of the apparatus, the predetermined integer frequency offset may be selected from a plurality of different integer frequency offsets.

In one alternative of the apparatus, the plurality of replicas of a PSS signal may include three replicas of PSS signals.

In one alternative of the apparatus, the memory may include information indicating, for each of the $m^{th}$ indices of the PSS root sequence, a predetermined number of timing shifts in the PSS cross correlation peak for respective frequency offsets.

In one alternative of the apparatus, the determining of the PSS cross correlation and the CP correlation for the OFDM signal z(n) may be performed with a periodicity that is a multiple of 5 ms.

In one alternative of the apparatus, the normalized combined PSS cross correlation values may be stored in the memory for each sample n of a predetermined period of the OFDM signal z(n) during which the PSS cross correlation is determined.

In accordance with an aspect of the disclosure, a wireless communication device may include a receiver to receive a signal of a wireless communication system; and a processing device configured to control determining time and frequency offset in the wireless communication system. The processing device may be configured to control: determining a cyclic prefix (CP) correlation, $R_{cp}(n)$, for an incoming Orthogonal Frequency Division Multiplexing (OFDM) signal z(n), wherein n is a sample index of the OFDM signal z(n), $$R_{cp}(n) = \left| \frac{1}{L} \sum_{l=0}^{L-1} z(n-l) \cdot z^*(n-l-N) \right|,$$

$z^*$ is a complex conjugate of z, N is a length in samples of an OFDM symbol of the OFDM signal z(n) which excludes a CP portion of the OFDM symbol, and L is a length in samples of the CP portion; determining an average CP power, $P_{cp}(n)$, for the OFDM signal z(n), wherein $$P_{cp}(n) = \frac{1}{2}\sum_{l=0}^{L-1} z(n-l)z^*(n-l) + z(n-l-N)z^*(n-l-N);$$

combining and normalizing the $R_{cp}(n)$ and the $P_{cp}(n)$ to obtain normalized combined CP correlation values; determining an estimated fractional frequency offset from a phase of a maximum value of the normalized combined CP correlation values; determining a composite frequency offset by summing the estimated fractional frequency offset and a predetermined integer frequency offset; determining a Primary Synchronization Signal (PSS) cross correlation, $R_{PSS\_m}(n)$, for the OFDM signal z(n), for each of a plurality of replicas of a PSS signal respectively corresponding to an $m^{th}$ index of a PSS root sequence, wherein $$R_{PSS\_m}(n) = \left| \frac{1}{K}\sum_{k=0}^{K-1} z(n-k) \cdot p_m^*(K-k) \right|,$$

is the replica of the PSS signal having the index m, and K is a length in samples of the replica of the PSS signal $p_m(n)$ at a sampling rate of the OFDM signal z(n), and the plurality of replicas of the PSS signals are stored in a memory; determining an average power, $P_{avg\_m}(n)$, of the OFDM signal z(n) and each $m^{th}$ replica of the PSS signal from the memory, wherein $$P_{avg_m}(n) = \sqrt{|P_z(n)| \times |P_{tr_m}|}, \ P_z(n) = \left| \frac{1}{K}\sum_{k=0}^{K-1} z(n-k) \cdot z^*(n-k) \right|,$$

and $$P_{tr\_m} = \left| \frac{1}{K}\sum_{k=0}^{K-1} p_m(k) \cdot p_m^*(k) \right|;$$

combining, for each respective $m^{th}$ index, the PSS cross correlation, $R_{PSS\_m}(n)$, and the average power, $P_{avg\_m}(n)$, to obtain combined PSS cross correlation values, and normalizing the PSS cross correlation values to obtain normalized combined PSS cross correlation values; determining a maximum value of the normalized combined PSS cross correlation values as an estimated PSS cross correlation peak; determining, from a table in the memory, based on the estimated composite frequency offset, an apparent timing shift in a PSS cross correlation peak of the OFDM signal z(n), in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

In one alternative of the wireless communication device, the processing device may be configured to control determining a Secondary Synchronization Signal (SSS) based on the detected PSS cross correlation peak position.

BRIEF DESCRIPTION OF THE DRAWINGS

FIG. 11 illustrates a list of frequency offsets and corresponding apparent timing shifts for each index according to the aspects of the present disclosure.

DETAILED DESCRIPTION

Figure 1:
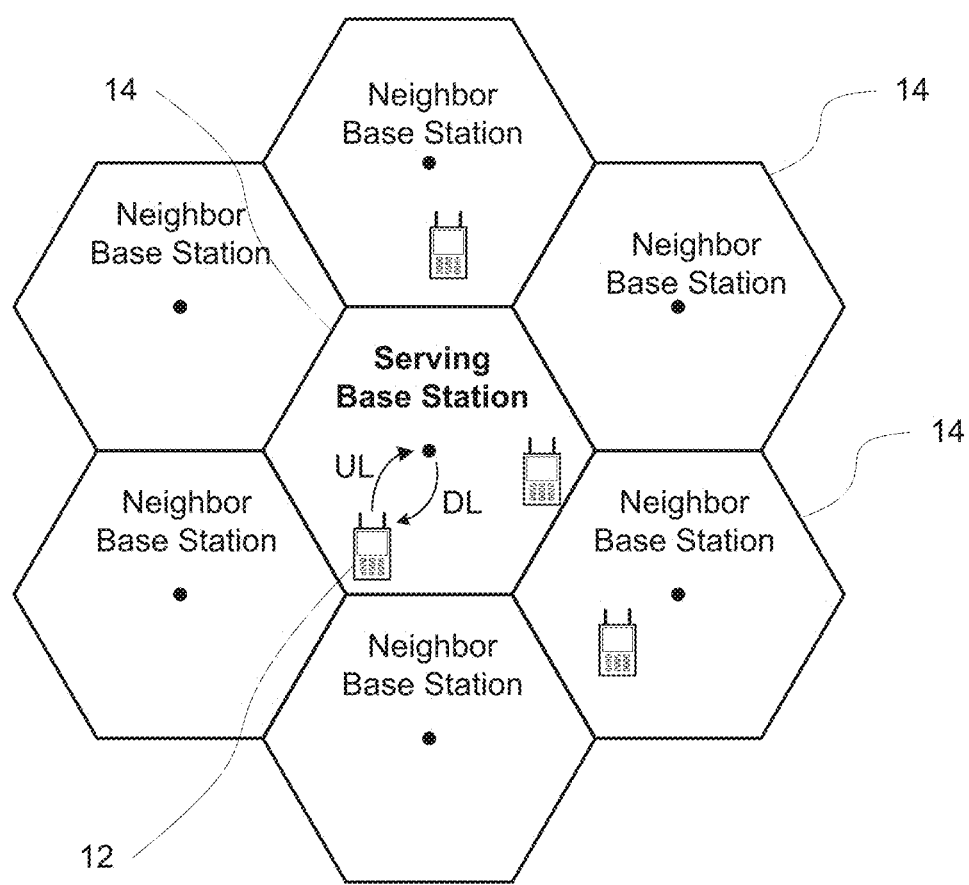
FIG. 1 illustrates a conventional wireless cellular communication system.
Figure 2:
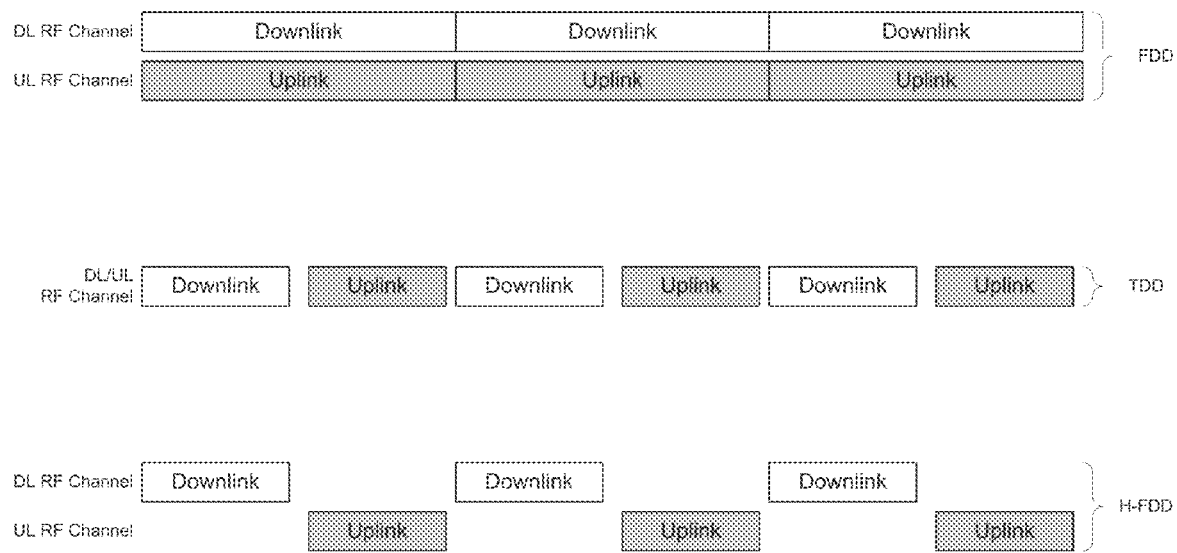
FIG. 2 illustrates FDD, TDD and H-FDD duplexing techniques.
Figure 3:
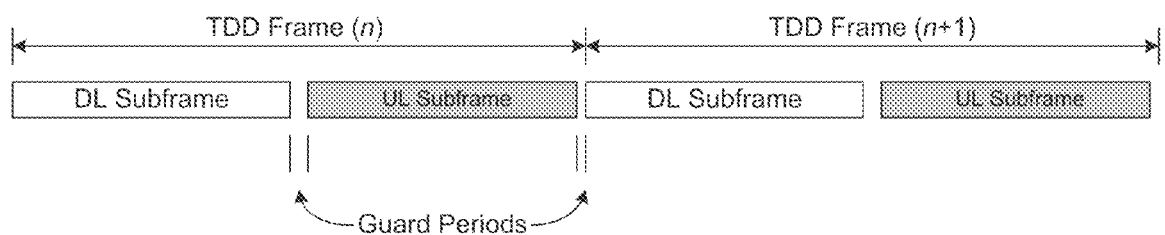
FIG. 3 illustrates a TDD frame consisting of DL portions and UL portions.
Figure 4:
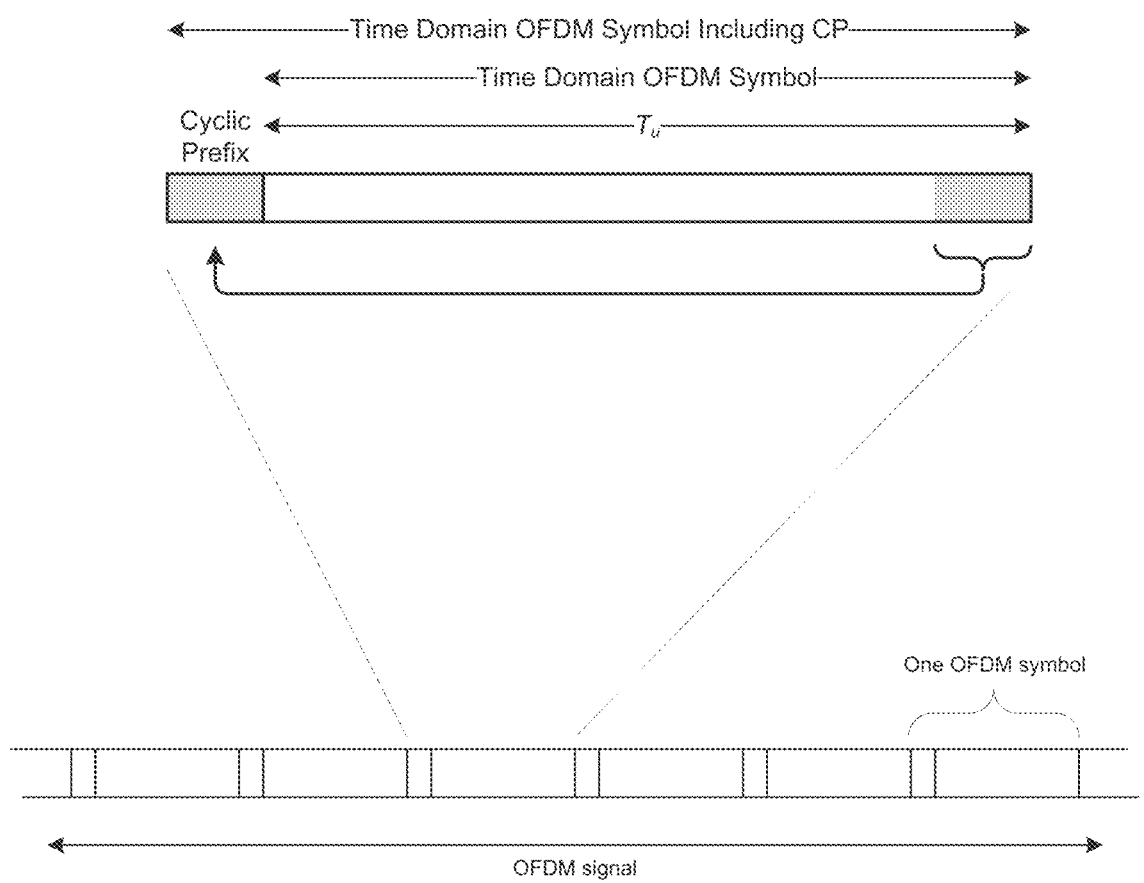
FIG. 4 illustrates an OFDM symbol with Cyclic Prefix Insertion.
Figure 5:
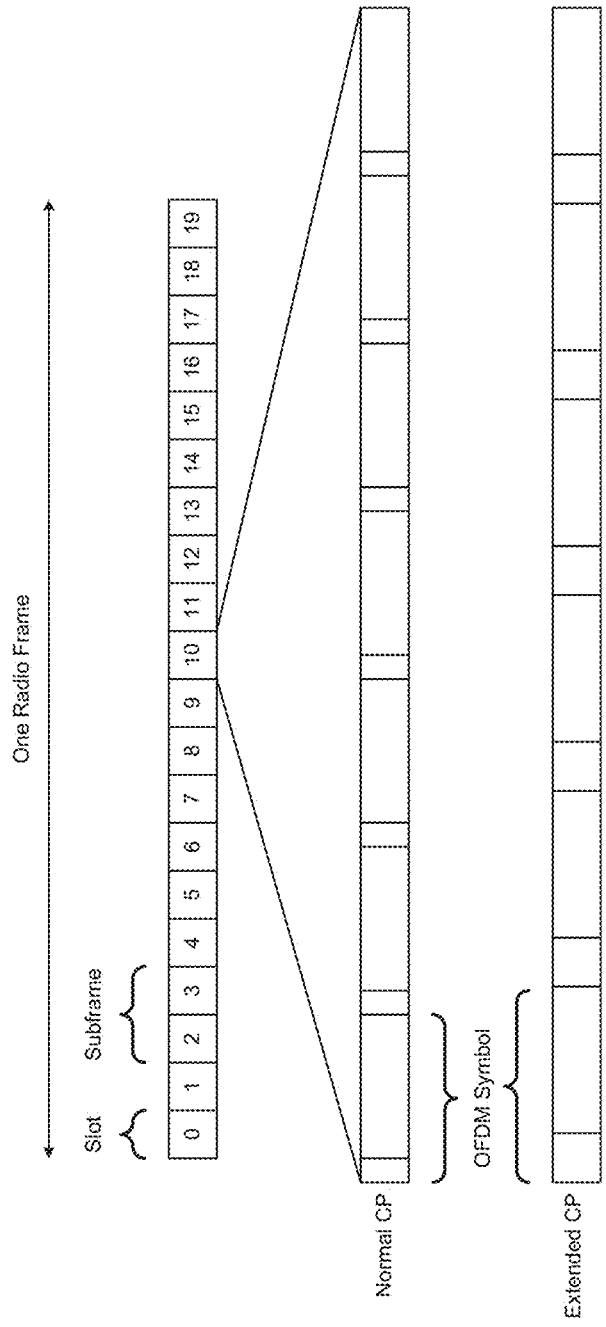
FIG. 5 illustrates the frame structure of the air interface of the 3GPP LTE wireless communication system.
Figure 6:
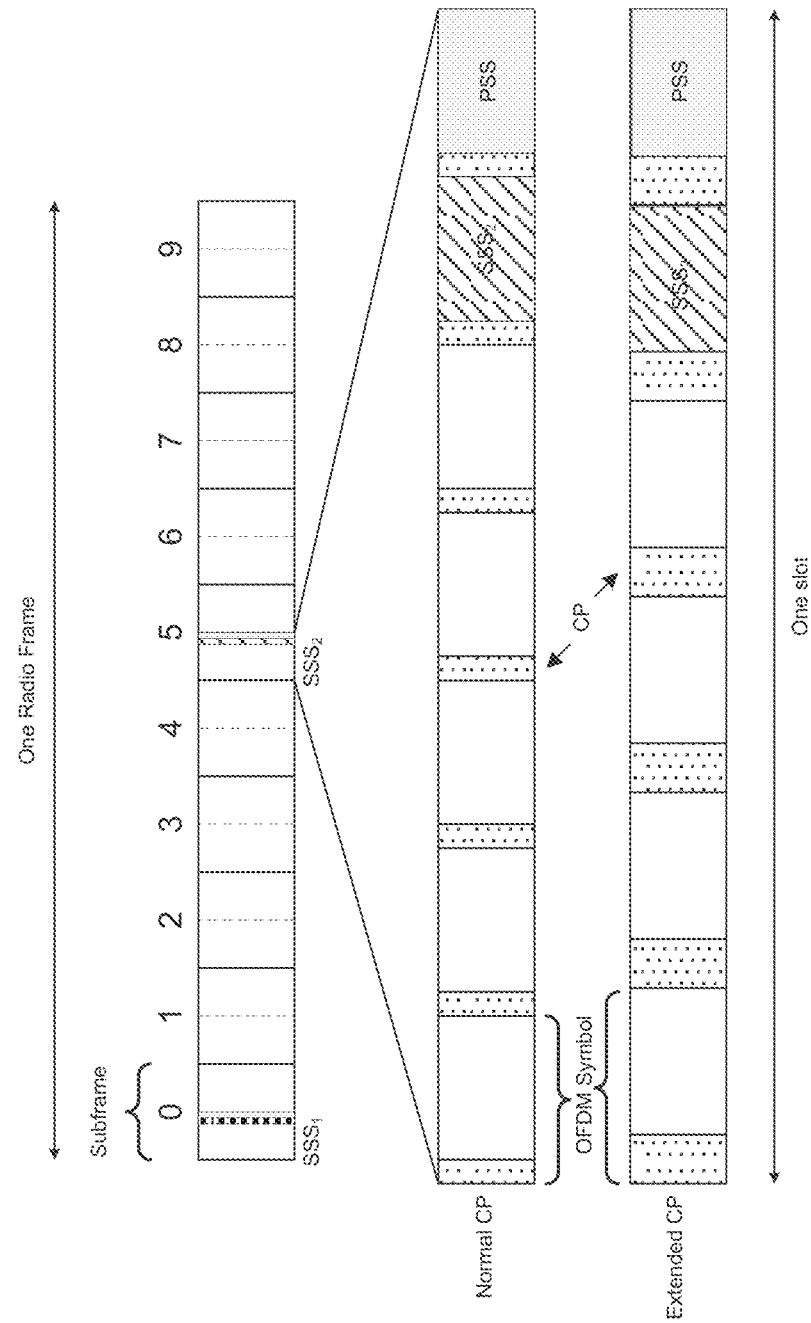
FIG. 6 illustrates the locations of PSS and SSS for Normal CP and Extended CP in a case of FDD 3GPP LTE wireless communication system.
Figure 7:
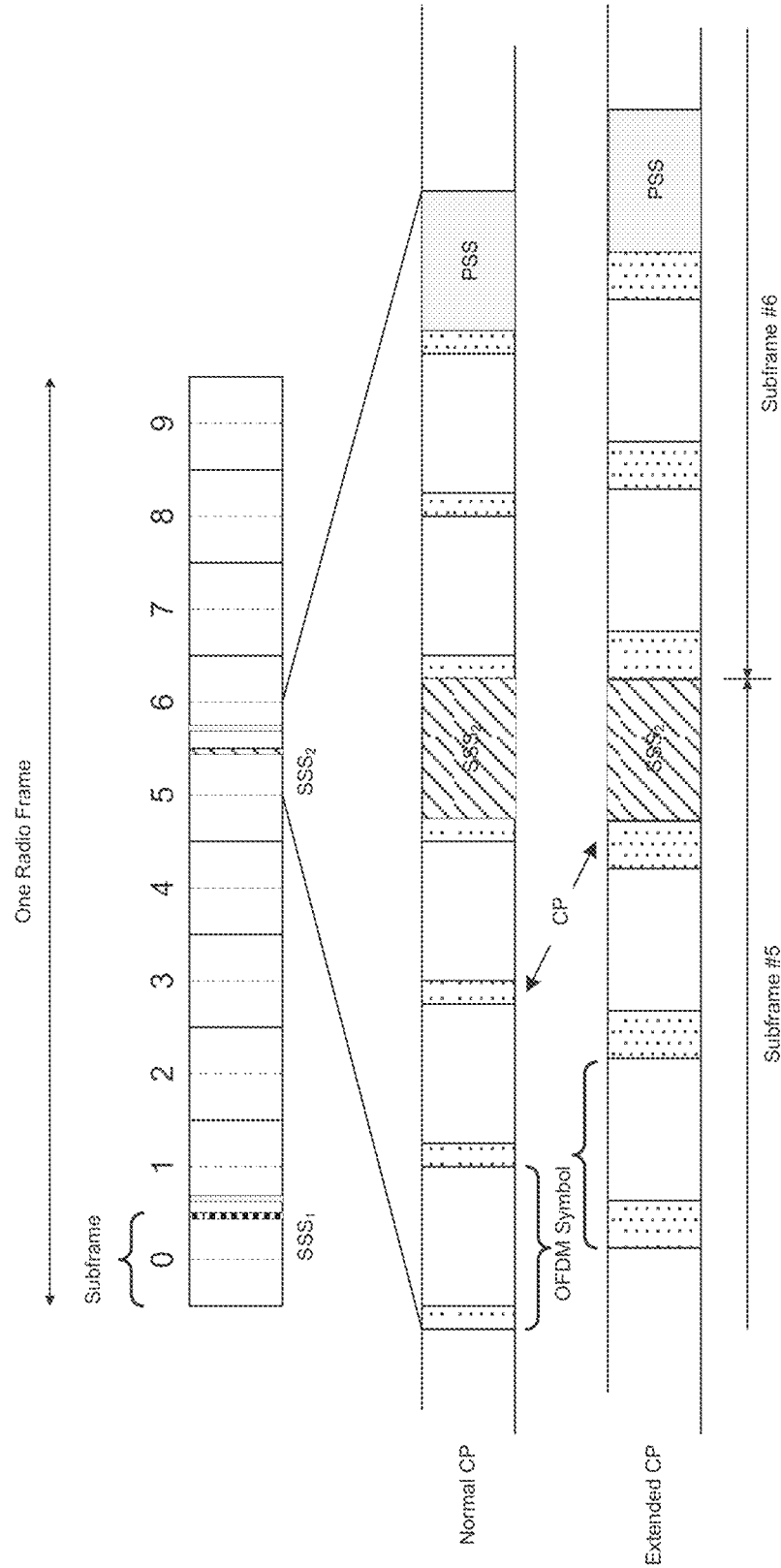
FIG. 7 illustrates the locations of PSS and SSS for Normal CP and Extended CP in a case of TDD 3GPP LTE wireless communication system.
Figure 8:
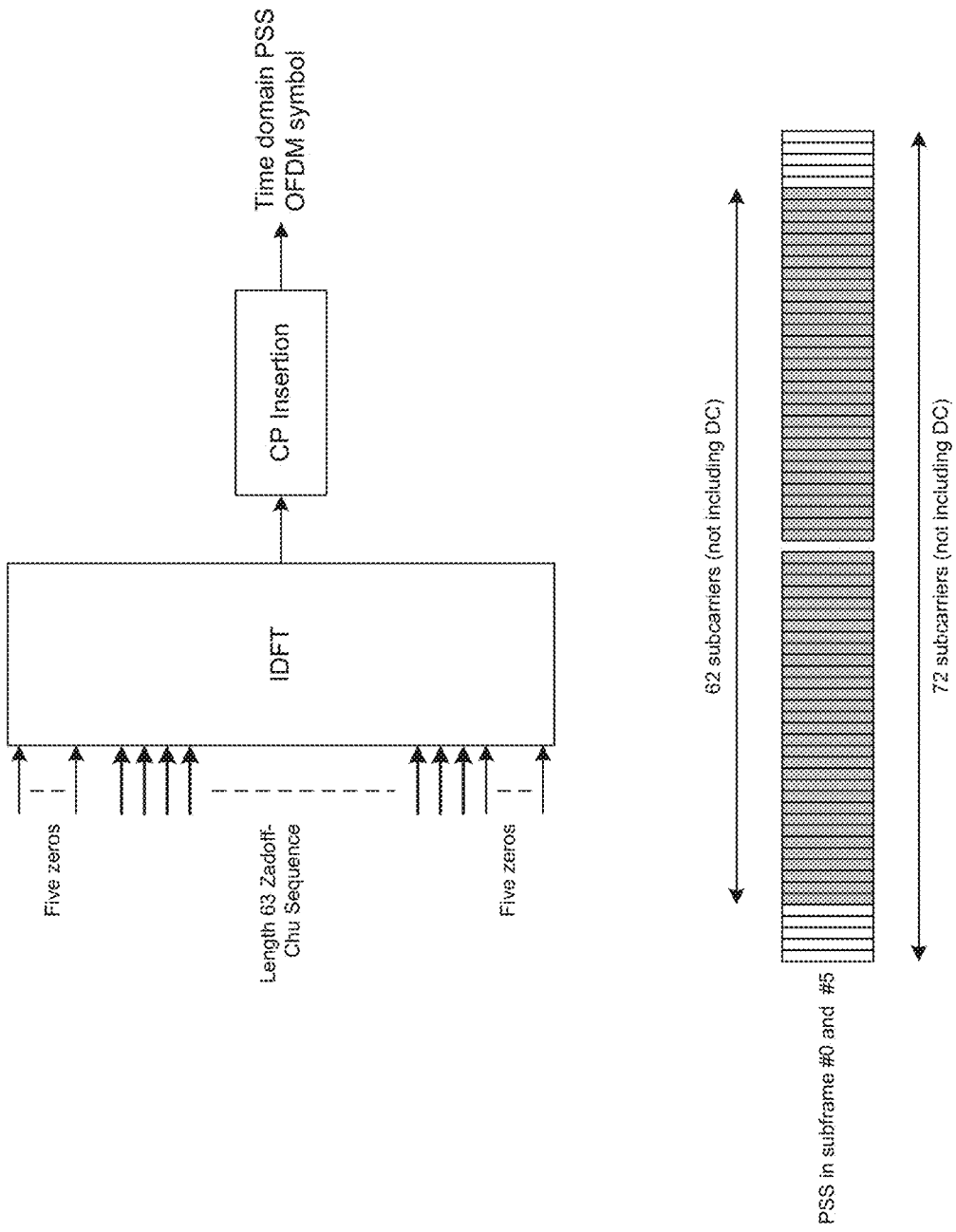
FIG. 8 illustrates PSS generation procedures for a 3GPP LTE wireless communication system.
Figure 9:
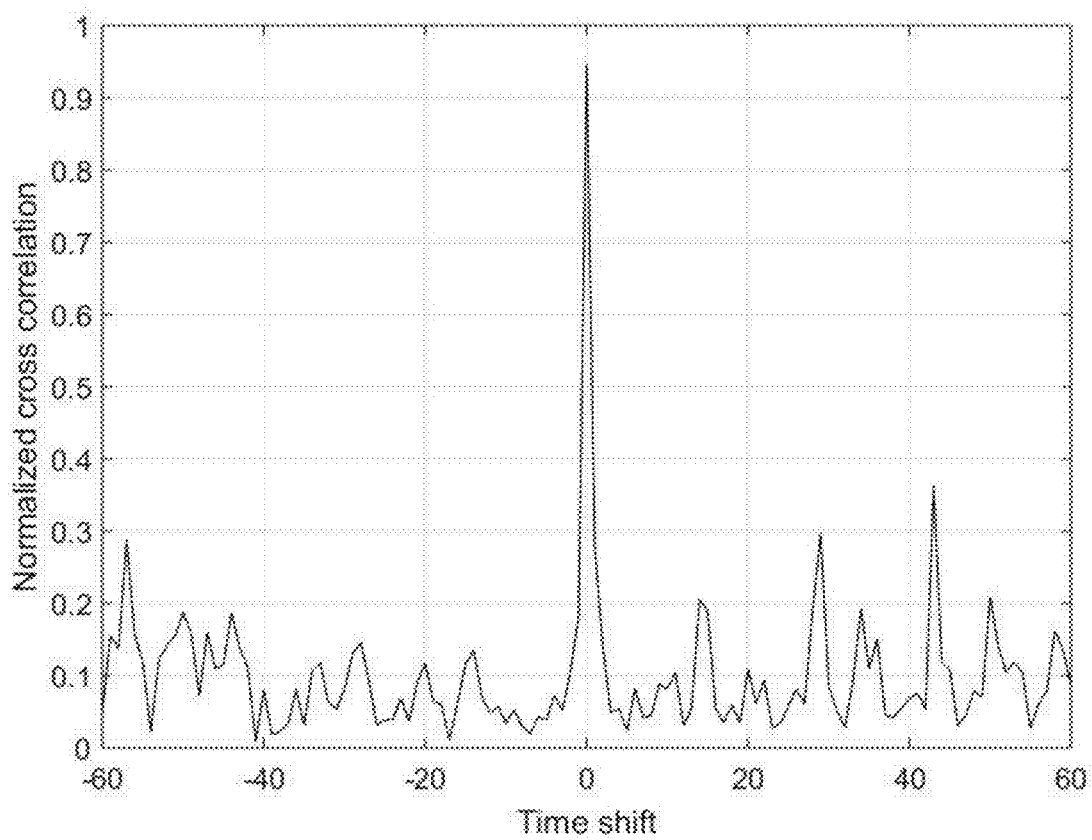
FIG. 9 illustrates PSS cross correlation output for PSS root index 0 in the absence of any frequency offset.
Figure 10:
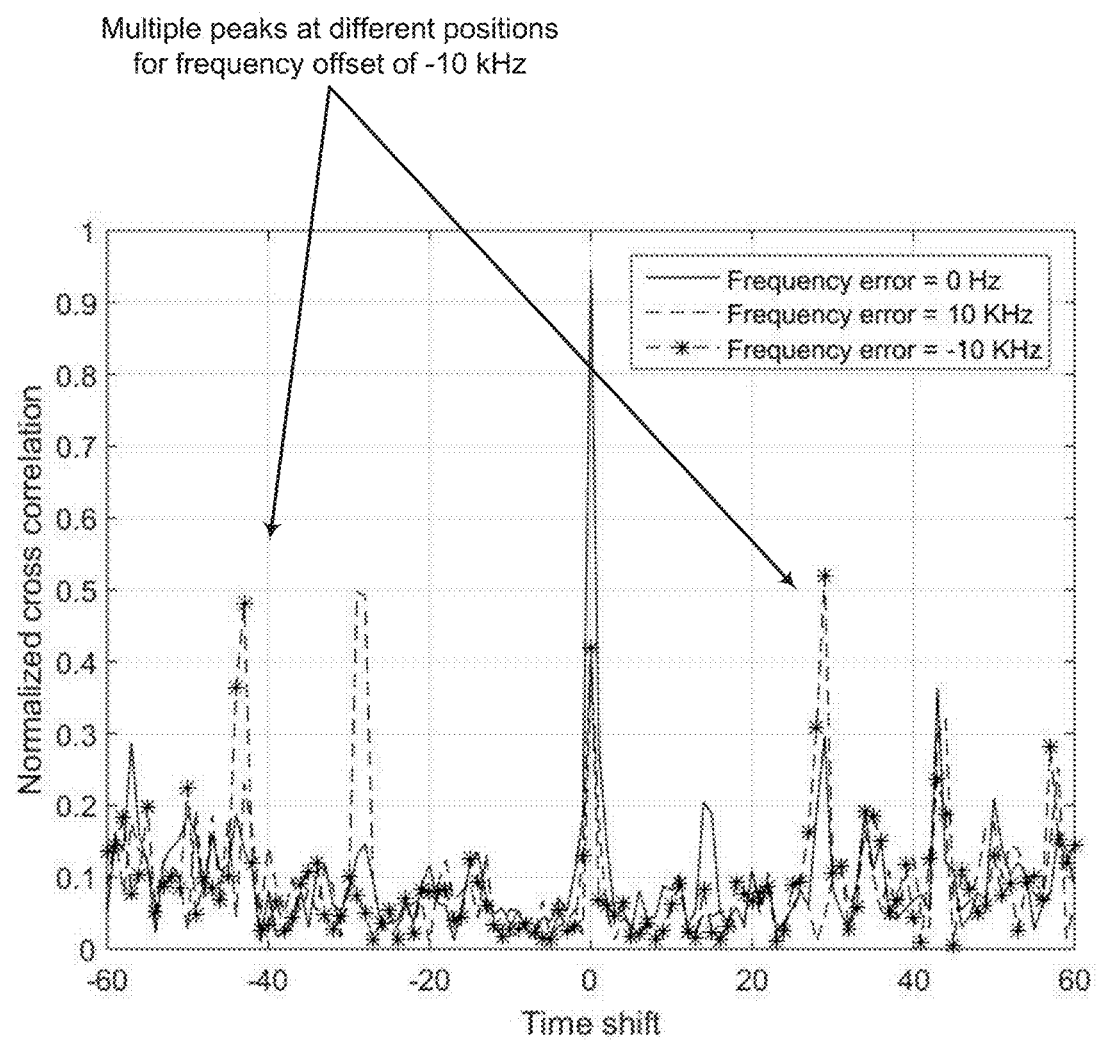
FIG. 10 illustrates PSS cross correlation output for PSS root index 0 with different frequency offsets in the received signal.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

According to an aspect of the present disclosure, a list of pre-computed shifts in PSS cross correlation peaks for all three different PSS indices as a function of different frequency offsets may be used. The table contained in FIG. 11 is one such table obtained by performing offline simulations for PSS cross correlation under known frequency offsets and known timing position. The offline simulations enable determination of the relationship between the frequency offset and the apparent shift in the position of the PSS cross correlation peak. In the example table of FIG. 11, five different frequency offsets and corresponding shifts in timing are considered for the PSS root indices 25 and 29 whereas three different frequency offsets and corresponding shifts in timing are considered for the PSS root indices 34. According to an aspect of the present disclosure, the granularity of the frequency error offsets for which the table is prepared may be configurable. For example, the number of frequency offsets for which the apparent timing shift is maintained may be seven for each of the PSS indices.

According to an aspect of the present disclosure, a CP correlator may be used to perform CP correlation as per EQ. (1) on the incoming signal for estimating the fractional frequency offset. According to an aspect of the present disclosure, in parallel to CP correlation, a PSS cross correlator may be used to perform cross correlation of the incoming signal with the three local replicas corresponding to the three PSS indices as per EQ. (4). According to another aspect of the present disclosure, the PSS cross correlation values may be saved for each incoming sample over the entire duration for which PSS cross correlation is performed.

The power $P_z(n)$ of the signal used for PSS cross correlation may be computed as follows:

$$P_z(n) = \left| \frac{1}{K} \sum_{k=0}^{K-1} z(n-k) \cdot z^*(n-k) \right| \quad (5)$$

Similarly, the power $P_{lr\_m}$ for local replica index m may be computed as follows:

$$P_{lr\_m} = \left| \frac{1}{K} \sum_{k=0}^{K-1} p_m(k) \cdot p_m^*(k) \right| \quad (6)$$

Note that the local replica power does not change and it may be computed offline and stored in memory. According to another aspect of the present disclosure, the average power $P_{avg\_m}(n)$ of the incoming signal and the $m^{th}$ local replica may be computed as follows:

$$P_{avg\_m}(n) = \sqrt{|P_z(n)| \times |P_{lr\_m}|} \quad (7)$$

According to another aspect of the present disclosure, the PSS cross correlation values are then normalized using the average of the estimated power of the incoming signal and the power of the local replica. Specifically, the normalized PSS cross correlation is given as follows:

$$R_m(n) = \frac{|R_{PSS\_m}(n)|}{P_{avg\_m}(n)} \quad (8)$$

The CP correlation and PSS cross correlation may be performed over a configurable duration of time. The configurable duration, for example, may be a multiple 5 ms since the PSS repeats every 5 ms. When the CP correlation and PSS cross correlation are performed over multiple 5 ms durations, the correlation from multiple such durations may be combined. For example, let the sampling rate of the incoming signal be 1.92 Msps. At this sampling rate there are 5 ms*1.92 Msps=9600 samples in one 5 ms duration. When the PSS correlation is performed over, for example, 10 ms duration, the PSS cross correlation for the $0^{th}$ sample may be combined with the PSS cross correlation of the $9600^{th}$ sample. Similarly, the PSS cross correlation of the $1^{st}$ sample may be combined with the PSS cross correlation of the $9601^{th}$ sample, and so on.

The CP correlation combining may be performed according to the CP correlation repetition interval. In the case of a 3GPP LTE wireless communication system, the CP length of different OFDM symbols in a slot may be different. However, the same structure repeats after for slot duration of 0.5 ms. Therefore the CP correlation may be combined over a period of 0.5 ms in a manner similar to the PSS combining. However, since the combining interval is only 0.5 ms, the CP correlation for the $0^{th}$ sample is combined with the CP correlation for the $960^{th}$ sample, the CP correlation for $1^{st}$ sample is combined with the CP correlation for the $961^{st}$ sample, and so on. CP correlation based frequency offset estimation may be performed, for example, as described in U.S. patent application Ser. No. 14/744,833, filed Jun. 19, 2015, the entire content of which is incorporated by reference herein. The periodicity of the parallel CP correlation and PSS cross correlation may be chosen to be a multiple of 5 ms which may lead to an integral number of combining for both CP correlation and PSS cross correlation.

After the CP correlation and PSS cross correlation are completed and combined over the configured duration, the fractional frequency offset may be computed using the phase of the maximum CP correlation value in the combining interval. In addition to the fractional frequency offset, a number of different hypotheses for the integer frequency offset may be considered. For example, ±1 integer frequency offsets may be considered. The integer frequency offset corresponding to the selected hypothesis may then be added to the estimated fractional frequency offset to estimate the composite frequency offset. Next the estimated composite frequency offset may be used to look up, from the table contained in FIG. 11, the apparent timing shift in the PSS cross correlation peak for that frequency offset. For the table look-up purposes, the entry in the table contained in FIG. 11 that is closest to the estimated composite frequency offset may be used. For example, if the estimated fractional frequency offset is −4000 Hz and the integer frequency offset is 15 kHz corresponding to a single subcarrier, the estimated composite frequency offset is −4000+15000=11000 Hz. The nearest value in the table contained in FIG. 11 is 10000 Hz and that may be used to look up the corresponding apparent shift in the cross correlation peak. The PSS cross correlation may be searched for the maximum value over the combined PSS cross correlation over the configured duration. Next the detected PSS cross correlation peak position is adjusted by the amount of timing shift looked up from the table contained in FIG. 11 for the estimated composite frequency offset. Next the SSS detection may be performed using the adjusted PSS peak cross correlation positions and by using a signal that is compensated for the estimated composite frequency offset corresponding to the hypothesis being considered for the integer frequency offset.

Figure 12:
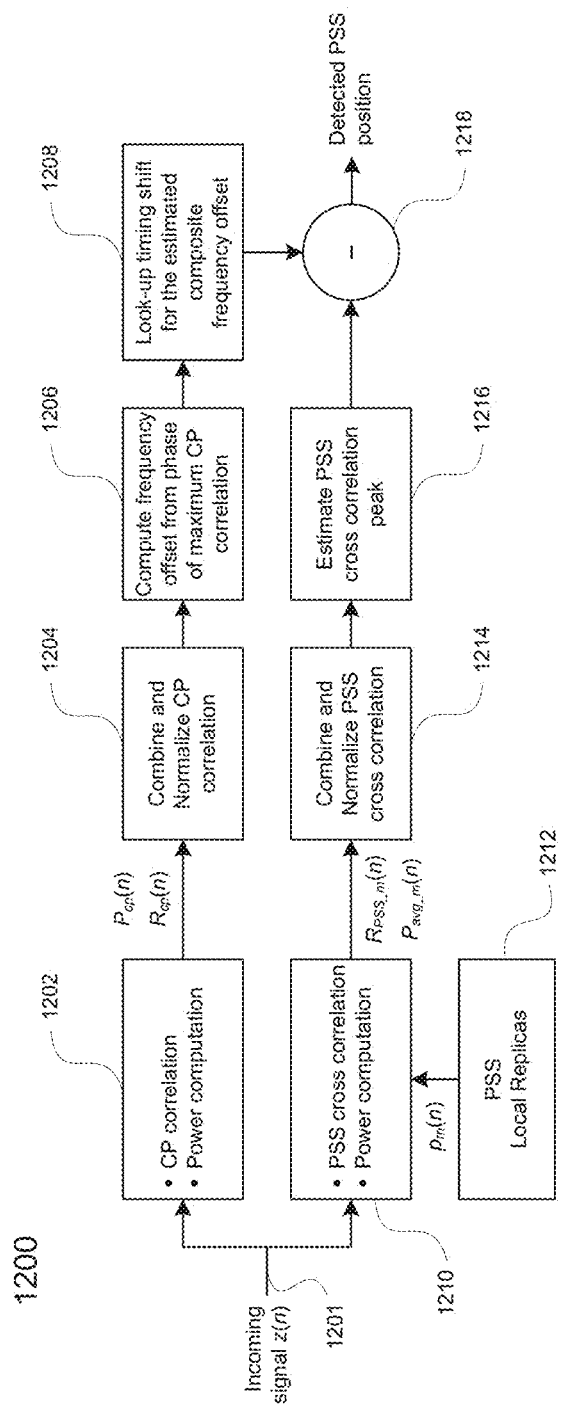
FIG. 12 illustrates the processing block diagram for joint time and frequency offset estimation according to the aspects of the present disclosure.

The flow diagram 1200 contained in FIG. 12 illustrates an exemplary joint time and frequency offset determination method according to the aspects of the present disclosure. The incoming time domain signal 1201 z(n) is input to both the CP correlation processing block 1202 and the PSS cross correlation processing block 1210. The CP correlation block 1202 computes and outputs the CP correlation $R_{cp}(n)$ and average CP power $P_{cp}(n)$. The processing block 1204 takes these outputs and performs normalization and combining. The output of processing block 1204 is used in processing block 1206 which searches for the maximum value of the normalized combined CP correlation. Once the normalized combined CP correlation maximum is found, its phase is used to estimate and output the observed frequency offset. At processing block 1208, the estimated fractional frequency offset is first added to the different integer frequency offset hypotheses to be considered and a composite frequency offset is estimated. The estimated composite frequency offset may then be used to look-up the closest frequency offset entry in the table contained in FIG. 11 for the detected index of the maximum PSS cross correlation. Returning to the processing block 1210, it computes and outputs the PSS cross correlation $R_{PSS\_m}(n)$ and average power $P_{avg\_m}(n)$ using the input signal z(n) 1201 and local replica $p_m(n)$ from the PSS local replicas storage block 1212. The output of the processing block 1210 is used in the processing block 1214 to perform normalization and combining. The processing block 1216 searches the output of the processing block 1214 for the maximum combined normalized PSS cross correlation. The estimated position of the maximum of the PSS cross correlation is output by the processing block 1216 which is an input to the processing block 1218. The processing block 1218 also receives another input from the processing block 1208 for adjustment of the detected PSS cross correlation peak. Finally, the adjusted detected PSS cross correlation peak position is output for subsequent SSS search.

By way of example only, the above-described method may be implemented in a receiver, e.g., a user device such as a wireless mobile station (MS) 12 as shown in FIG. 1.

Figure 13:
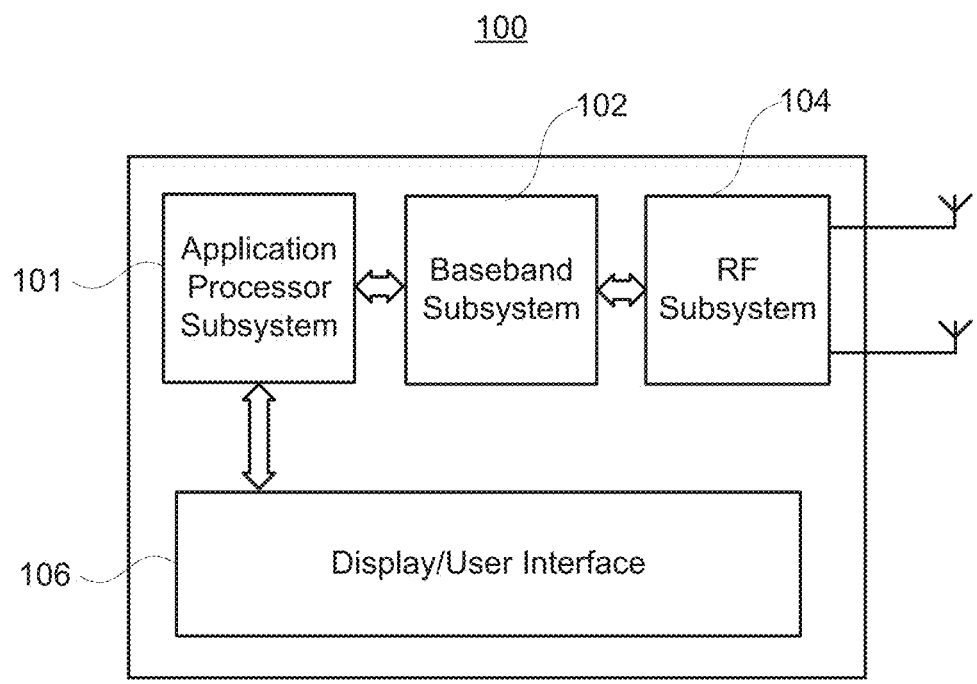
FIG. 13 illustrates a wireless mobile station diagram, which may be employed with aspects of the disclosure described herein.

As shown in FIG. 13, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 14:
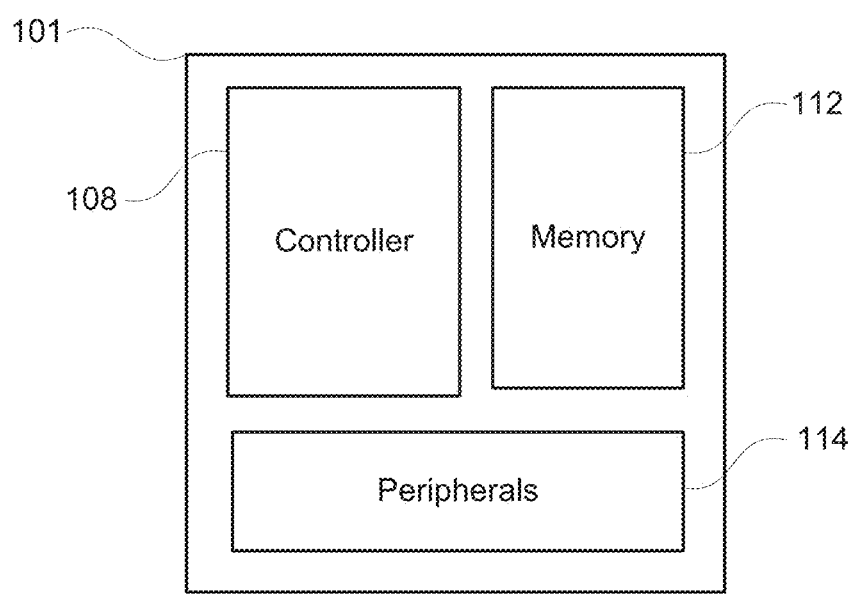
FIG. 14 illustrates an application processor subsystem for a wireless mobile station, which may be employed with aspects of the disclosure described herein.
Figure 15:
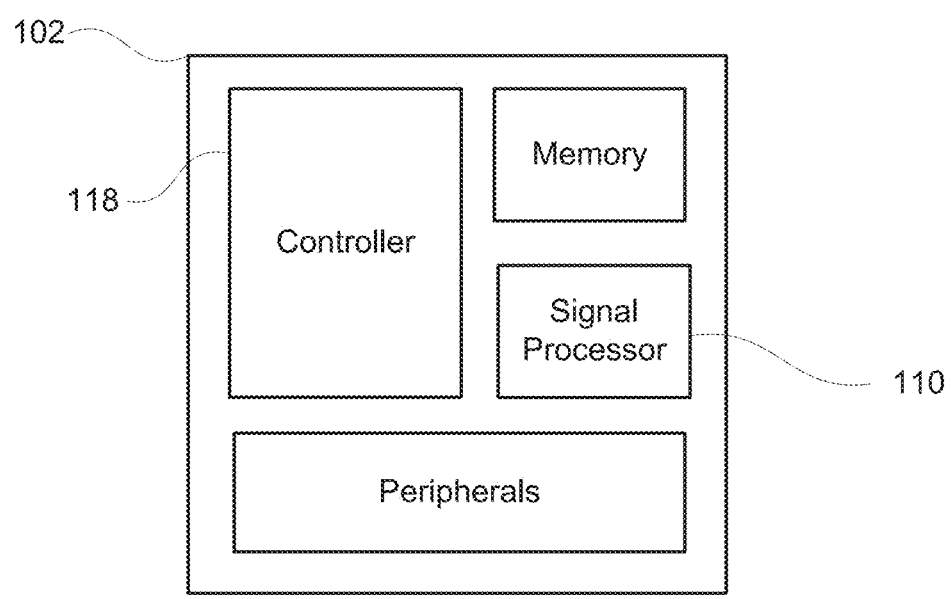
FIG. 15 illustrates a baseband subsystem for a wireless mobile station, which may be employed with aspects of the disclosure described herein.
Figure 16:
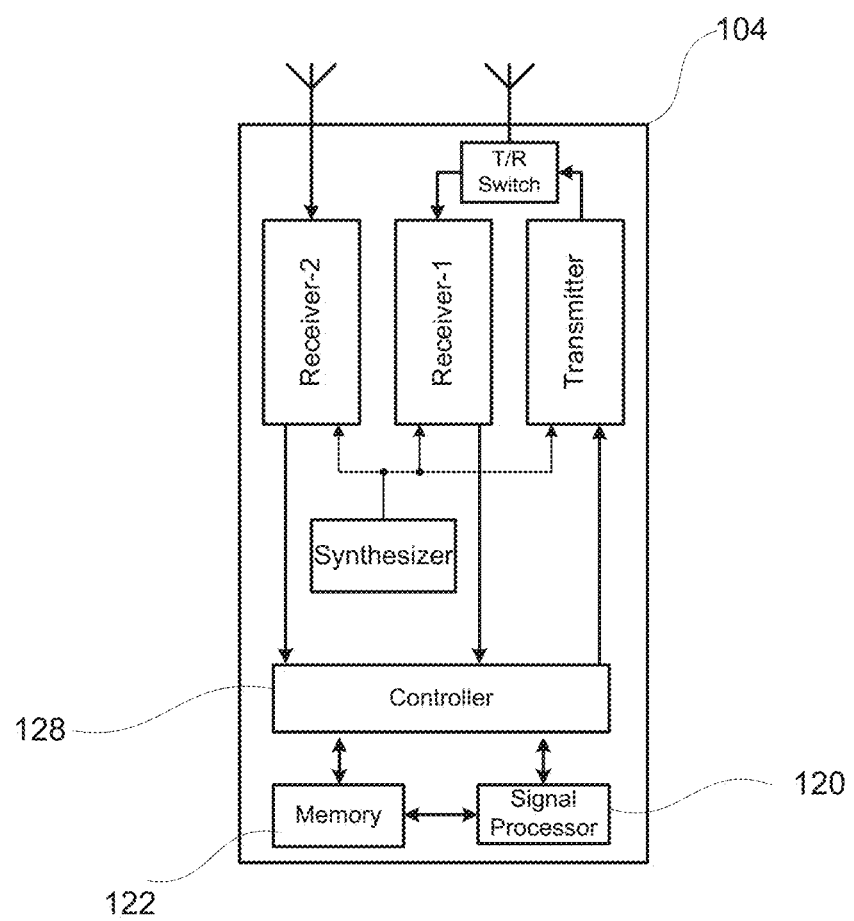
FIG. 16 illustrates a Radio Frequency (RF) subsystem for a wireless mobile station, which may be employed with aspects of the disclosure described herein.

The application processor subsystem 101 as shown in FIG. 14 may include a controller 108 such as a microcontroller, another processor or other circuitry. The baseband subsystem 102 as shown in FIG. 15 may include a controller 118 such as a microcontroller or other processor. The RF subsystem 104 as shown in FIG. 16 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 15 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for determining time and frequency offset at a client device in a wireless communication system, the method comprising:

controlling, by a processing device,
determining a cyclic prefix (CP) correlation, $R_{cp}(n)$, for an incoming Orthogonal Frequency Division Multiplexing (OFDM) signal z(n), wherein n is a sample index of the OFDM signal $$z(n), R_{cp}(n) = \left| \frac{1}{L} \sum_{l=0}^{L-1} z(n-l) \cdot z^*(n-l-N) \right|,$$

z* is a complex conjugate of z, N is a length in samples of an OFDM symbol of the OFDM signal z(n) which excludes a CP portion of the OFDM symbol, and L is a length in samples of the CP portion;

determining an average CP power, $P_{cp}(n)$, for the OFDM signal z(n), wherein $$P_{cp}(n) = \frac{1}{2} \sum_{l=0}^{L-1} z(n-l)z^*(n-l) + z(n-l-N)z^*(n-l-N);$$

combining and normalizing the $R_{cp}(n)$ and the $P_{cp}(n)$ to obtain normalized combined CP correlation values;
determining an estimated fractional frequency offset from a phase of a maximum value of the normalized combined CP correlation values;
determining a composite frequency offset by summing the estimated fractional frequency offset and a predetermined integer frequency offset;
determining a Primary Synchronization Signal (PSS) cross correlation, $R_{PSS\_m}(n)$, for the OFDM signal z(n), for each of a plurality of replicas of a PSS signal respectively corresponding to an $m^{th}$ index of a PSS root sequence,
wherein $$R_{PSS\_m}(n) = \left| \frac{1}{K} \sum_{k=0}^{K-1} z(n-k) \cdot p_m^*(K-k) \right|,$$

$p_m(n)$ is the replica of the PSS signal having the index m, and K is a length in samples of the replica of the PSS signal $p_m(n)$ at a sampling rate of the OFDM signal $z(n)$, and the plurality of replicas of the PSS signals are stored in a memory;

determining an average power, $P_{avg\_m}(n)$, of the OFDM signal $z(n)$ and each $m^{th}$ replica of the PSS signal from the memory, wherein $P_{avg_m}(n) = \sqrt{|P_z(n)| \times |P_{lr_m}|}$, $P_z(n) = \left| \frac{1}{K} \sum_{k=0}^{K-1} z(n-k) \cdot z^*(n-k) \right|$, and $P_{lr\_m} = \left| \frac{1}{K} \sum_{k=0}^{K-1} p_m(k) \cdot p_m^*(k) \right|$;

combining, for each respective $m^{th}$ index, the PSS cross correlation, $R_{PSS\_m}(n)$, and the average power, $P_{avg\_m}(n)$, to obtain combined PSS cross correlation values, and normalizing the PSS cross correlation values to obtain normalized combined PSS cross correlation values;

determining a maximum value of the normalized combined PSS cross correlation values as an estimated PSS cross correlation peak;

determining, from a table in the memory, based on the estimated composite frequency offset, an apparent timing shift in a PSS cross correlation peak of the OFDM signal $z(n)$, in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

2. The method of claim 1, wherein the normalized combined PSS correlation values are determined from $|R_{PSS\_m}(n)|/P_{avg\_m}(n)$.

3. The method of claim 1, wherein the normalized combined CP correlation values are determined from $R_{cp}(n)/P_{cp}(n)$.

4. The method of claim 1, further comprising:

controlling, by the processing device, determining a Secondary Synchronization Signal (SSS) based on the detected PSS cross correlation peak position.

5. The method of claim 1, wherein the predetermined integer frequency offset is selected from a plurality of different integer frequency offsets.

6. The method of claim 1, wherein the plurality of replicas of a PSS signal includes three replicas of PSS signals.

7. The method of claim 1, wherein the memory includes information indicating, for each of the $m^{th}$ indices of the PSS root sequence, a predetermined number of timing shifts in the PSS cross correlation peak for respective frequency offsets.

8. The method of claim 1, wherein the determining of the PSS cross correlation and the CP correlation for the OFDM signal $z(n)$ is performed with a periodicity that is a multiple of 5 ms.

9. The method of claim 1, wherein the normalized combined PSS cross correlation values are stored in the memory for each sample n of a predetermined period of the OFDM signal $z(n)$ during which the PSS cross correlation is determined.

10. An apparatus for determining time and frequency offset at a client device in a wireless communication system, the apparatus comprising:

circuitry configured to control:

determining a cyclic prefix (CP) correlation, $R_{cp}(n)$, for an incoming Orthogonal Frequency Division Multiplexing (OFDM) signal $z(n)$, wherein n is a sample index of the OFDM signal $z(n)$, $R_{cp}(n) = \left| \frac{1}{L} \sum_{l=0}^{L-1} z(n-l) \cdot z^*(n-l-N) \right|$, $z^*$ is a complex conjugate of z, N is a length in samples of an OFDM symbol of the OFDM signal $z(n)$ which excludes a CP portion of the OFDM symbol, and L is a length in samples of the CP portion;

determining an average CP power, $P_{cp}(n)$, for the OFDM signal $z(n)$, wherein $P_{cp}(n) = \frac{1}{2} \sum_{l=0}^{L-1} z(n-l)z^*(n-l) + z(n-l-N)z^*(n-l-N)$;

combining and normalizing the $R_{cp}(n)$ and the $P_{cp}(n)$ to obtain normalized combined CP correlation values;

determining an estimated fractional frequency offset from a phase of a maximum value of the normalized combined CP correlation values;

determining a composite frequency offset by summing the estimated fractional frequency offset and a predetermined integer frequency offset;

determining a Primary Synchronization Signal (PSS) cross correlation, $R_{PSS\_m}(n)$, for the OFDM signal $z(n)$, for each of a plurality of replicas of a PSS signal respectively corresponding to an $m^{th}$ index of a PSS root sequence, wherein $R_{PSS\_m}(n) = \left| \frac{1}{K} \sum_{k=0}^{K-1} z(n-k) \cdot p_m^*(K-k) \right|$, $p_m(n)$ is the replica of the PSS signal having the index m, and K is a length in samples of the replica of the PSS signal $p_m(n)$ at a sampling rate of the OFDM signal $z(n)$, and the plurality of replicas of the PSS signals are stored in a memory;

determining an average power, $P_{avg\_m}(n)$, of the OFDM signal $z(n)$ and each $m^{th}$ replica of the PSS signal from the memory, wherein $P_{avg_m}(n) = \sqrt{|P_z(n)| \times |P_{lr_m}|}$, $P_z(n) = \left| \frac{1}{K} \sum_{k=0}^{K-1} z(n-k) \cdot z^*(n-k) \right|$, and $P_{lr\_m} = \left| \frac{1}{K} \sum_{k=0}^{K-1} p_m(k) \cdot p_m^*(k) \right|$;

combining, for each respective $m^{th}$ index, the PSS cross correlation, $R_{PSS\_m}(n)$, and the average power, $P_{avg\_m}(n)$, to obtain combined PSS cross correlation values, and normalizing the PSS cross correlation values to obtain normalized combined PSS cross correlation values;

determining a maximum value of the normalized combined PSS cross correlation values as an estimated PSS cross correlation peak;

determining, from a table in the memory, based on the estimated composite frequency offset, an apparent timing shift in a PSS cross correlation peak of the OFDM signal z(n), in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

11. The apparatus of claim 10, wherein the normalized combined PSS correlation values are determined from $|R_{PSS\_m}(n)|/P_{avg\_m}(n)$.

12. The apparatus of claim 10, wherein the normalized combined CP correlation values are determined from $R_{cp}(n)/P_{cp}(n)$.

13. The apparatus of claim 10,
wherein the circuitry is configured to control determining a Secondary Synchronization Signal (SSS) based on the detected PSS cross correlation peak position.

14. The apparatus of claim 10, wherein the predetermined integer frequency offset is selected from a plurality of different integer frequency offsets.

15. The apparatus of claim 10, wherein the plurality of replicas of a PSS signal includes three replicas of PSS signals.

16. The apparatus of claim 10, wherein the memory includes information indicating, for each of the $m^{th}$ indices of the PSS root sequence, a predetermined number of timing shifts in the PSS cross correlation peak for respective frequency offsets.

17. The apparatus of claim 10, wherein the determining of the PSS cross correlation and the CP correlation for the OFDM signal z(n) is performed with a periodicity that is a multiple of 5 ms.

18. The apparatus of claim 10, wherein the normalized combined PSS cross correlation values are stored in the memory for each sample n of a predetermined period of the OFDM signal z(n) during which the PSS cross correlation is determined.

19. A wireless communication device comprising:
a receiver to receive a signal of a wireless communication system; and
a processing device configured to control determining time and frequency offset in the wireless communication system, wherein the processing device is configured to control:
determining a cyclic prefix (CP) correlation, $R_{cp}(n)$, for an incoming Orthogonal Frequency Division Multiplexing (OFDM) signal z(n), wherein n is a sample index of the OFDM signal z(n), $$R_{cp}(n) = \left| \frac{1}{L} \sum_{l=0}^{L-1} z(n-l) \cdot z^*(n-l-N) \right|,$$

z* is a complex conjugate of z, N is a length in samples of an OFDM symbol of the OFDM signal z(n) which excludes a CP portion of the OFDM symbol, and L is a length in samples of the CP portion;

determining an average CP power, $P_{cp}(n)$, for the OFDM signal z(n), wherein $$P_{cp}(n) = \frac{1}{2} \sum_{l=0}^{L-1} z(n-l)z^*(n-l) + z(n-l-N)z^*(n-l-N);$$

combining and normalizing the $R_{cp}(n)$ and the $P_{cp}(n)$ to obtain normalized combined CP correlation values;

determining an estimated fractional frequency offset from a phase of a maximum value of the normalized combined CP correlation values;

determining a composite frequency offset by summing the estimated fractional frequency offset and a predetermined integer frequency offset;

determining a Primary Synchronization Signal (PSS) cross correlation, $R_{PSS\_m}(n)$, for the OFDM signal z(n), for each of a plurality of replicas of a PSS signal respectively corresponding to an $m^{th}$ index of a PSS root sequence, wherein $$R_{PSS\_m}(n) = \left| \frac{1}{K} \sum_{k=0}^{K-1} z(n-k) \cdot p_m^*(K-k) \right|,$$

$p_m(n)$ is the replica of the PSS signal having the index m, and K is a length in samples of the replica of the PSS signal $p_m(n)$ at a sampling rate of the OFDM signal z(n), and the plurality of replicas of the PSS signals are stored in a memory;

determining an average power, $P_{avg\_m}(n)$, of the OFDM signal z(n) and each $m^{th}$ replica of the PSS signal from the memory, wherein $P_{avg_m}(n) = \sqrt{|P_z(n)| \times |P_{lr_m}|}$, $$P_z(n) = \left| \frac{1}{K} \sum_{k=0}^{K-1} z(n-k) \cdot z^*(n-k) \right|, \text{ and}$$

$$P_{lr\_m} = \left| \frac{1}{K} \sum_{k=0}^{K-1} p_m(k) \cdot p_m^*(k) \right|;$$

combining, for each respective $m^{th}$ index, the PSS cross correlation, $R_{PSS\_m}(n)$, and the average power, $P_{avg\_m}(n)$, to obtain combined PSS cross correlation values, and normalizing the PSS cross correlation values to obtain normalized combined PSS cross correlation values;

determining a maximum value of the normalized combined PSS cross correlation values as an estimated PSS cross correlation peak;

determining, from a table in the memory, based on the estimated composite frequency offset, an apparent timing shift in a PSS cross correlation peak of the OFDM signal z(n), in which the apparent timing shift corresponds to a frequency offset for the $m^{th}$ index of the PPS Root Sequence to which the maximum value of the normalized combined PSS cross correlation values corresponds; and determining a detected PSS cross correlation peak position by adjusting a position of the estimated PSS cross correlation peak by the apparent timing shift.

20. The wireless communication device of claim 19, wherein the processing device is configured to control determining a Secondary Synchronization Signal (SSS) based on the detected PSS cross correlation peak position.

* * * * *